United States Patent [19]

Morse

[11] Patent Number: 4,825,023

[45] Date of Patent: Apr. 25, 1989

[54] ARMORED AXIALLY DISPLACEABLE SEALING APPARATUS

[75] Inventor: Milton Morse, Fort Lee, N.J.

[73] Assignee: Nena Morse, Fort Lee, N.J.

[21] Appl. No.: 910,009

[22] Filed: Sep. 22, 1986

[51] Int. Cl.[4] ........................ H01H 13/06; F16J 15/32

[52] U.S. Cl. ............................ 200/302.2; 277/212 FB

[58] Field of Search ............... 200/302.2, 302.1, 302.3; 277/212 FB, 237 A, DIG. 4, 212 R, 212 C

[56] References Cited

U.S. PATENT DOCUMENTS

| | | | |
|---|---|---|---|
| 2,795,144 | 6/1957 | Morse | 200/302.3 X |
| 3,586,811 | 6/1971 | Amis, Jr. | 200/302 |
| 4,298,778 | 11/1981 | Beresford-Jones | 200/302.2 |
| 4,596,912 | 6/1986 | Hattori | 200/302.2 |

FOREIGN PATENT DOCUMENTS

| | | | |
|---|---|---|---|
| 2362764 | 7/1974 | Fed. Rep. of Germany | 277/212 FB |
| 0620961 | 4/1949 | United Kingdom | 200/302.2 |

*Primary Examiner*—Stanley N. Gilreath

*Attorney, Agent, or Firm*—Weingram & Zall

[57] ABSTRACT

An axially displaceable armored sealing apparatus for push button switches and the like. The apparatus includes a sealed nut unit connected to an anvil for actuating the plunger of a switch by means of a flexible elastomeric member forming a cavity for the plunger of the switch. The anvil is connected to a moveable armored cap that fits over the end of a stationary metal cylinder supported by the nut and which cap is axially displaceable with respect to the stationary cylindrical portion of the sealing apparatus. The displacement required to actuate the switch is less than the displacement necessary to cause the movable armored cap to contact either the flexible elastomeric member or the stationary cylindrical portion of the sealing apparatus.

9 Claims, 2 Drawing Sheets

ARMORED AXIALLY DISPLACEABLE SEALING APPARATUS

BACKGROUND OF THE INVENTION

1. Field of the Invention

This invention relates generally to the field of sealing devices and particularly to sealing devices of the type including a nut engageable with various types of control devices such as toggle or push button switches and the like, to maintain these devices within an opening in a panel and simultaneously to provide a moistureproof seal between the control device and the panel.

2. Description of the Prior Art

It has long been necessary to provide seals for axial displaced or push button-type switches that are mounted on panels or that protrude from various housings. One of the problems with this type of sealing apparatus is that the axial displacement necessary to actuate the switch makes it difficult to enclose the fragile portions of the seal and protect it from rupture or tear due to normal use or vandalism. The seal must be flexible in order to accommodate the axial displacement, and must provide a complete closure around the plunger of the switch. Therefore, seals which are made from resilient materials, usually elastomeric materials such as rubber or synthetic rubbers are relatively fragile, short-lived. They are susceptible to ripping, tearing or other forms of rupture, either in the normal course of their service life, or because of conscious or unconscious abuse.

Because many push button or axial displacement type switches tend to be sensitive to the pressure necessary for actuation, it is also desirable that any sealing apparatus that encloses the switch will have a minimal affect on the force necessary to actuate the switch.

Further, it is desirable that any sealing device for a push button switch should provide a comfortable and positive surface for actuation by pressing the end of the seal.

SUMMARY OF THE INVENTION

To overcome the problems discussed, the present invention sets forth an axially displaceable armored sealing apparatus for push button switches and the like. The apparatus includes a sealed nut unit connected to an anvil for actuating the plunger of a switch by means of a flexible elastomeric member forming a cavity for the plunger of the switch. The anvil is connected to a moveable armored cap that fits over the end of a stationary metal cylinder supported by the nut and which cap is axially displaceable with respect to the stationary cylindrical portion of the sealing apparatus. The displacement required to actuate the switch is less than the displacement necessary to cause the moveable armored cap to contact either the flexible elastomeric member or the stationary cylindrical portion of the sealing apparatus.

Accordingly, it is an object of the invention to provide an axially displaceable armored sealing apparatus for push button switches and the like which completely covers and seals the switch.

It is another object of the invention to provide an axially displaceable armored sealing apparatus for push button switches and the like which provides a full moistureproof seal between the switch and the panel in which the switch is to be mounted.

It is yet another object of the invention to provide an axially displaceable armored sealing apparatus for push button switches and the like which is constructed so that the flexible material used for sealing in the apparatus does not contact either the plunger of the switch or the object which presses the switch to actuate it.

Still another object of the invention is to provide an axially displaceable armored sealing apparatus for push button switches and the like in which the flexible material used in the apparatus is completely enclosed.

A further object of the invention is to provide an axially displaceable armored sealing apparatus for push button switches and the like in where the flexible materials used in the sealing apparatus cannot accidentally be torn and which apparatus is relatively vandal-proof.

It is another object of the invention to provide an axially displaceable armored sealing apparatus for push button switches and the like which has an extended service life and is relatively durable and reliable.

A further object of the invention is to provide an axially displaceable armored sealing apparatus for push button switches and the like which does not affect the operation or actuation of the switch that is sealed.

Yet another object of the invention is to provide an axially displaceable armored sealing apparatus for push button switches and the like which has minimum resilient bias on the action of the switch.

Still another object of the invention is to provide an axially displaceable armored sealing apparatus for push button switches and the like which sealing apparatus can be installed within the same size as the existing switches that it is meant to seal.

Yet a further object of the invention to provide an axially displaceable armored sealing apparatus for push button switches and the like which is easy to install and requires no special tools.

It is another object of the invention to provide an axially displaceable armored sealing apparatus for push button switches and the like which is relatively simple to manufacture.

A further object of the invention is to provide an axially displaceable armored sealing apparatus for push button switches and the like which provides a minimum stress on the flexible parts of the sealing apparatus.

Other objects and advantages will be apparent from the following description of an embodiment of the invention, and the novel features will be particularly pointed out hereinafter in the claims.

DETAILED DESCRIPTION OF THE DISCLOSED EMBODIMENT

Figure 1:
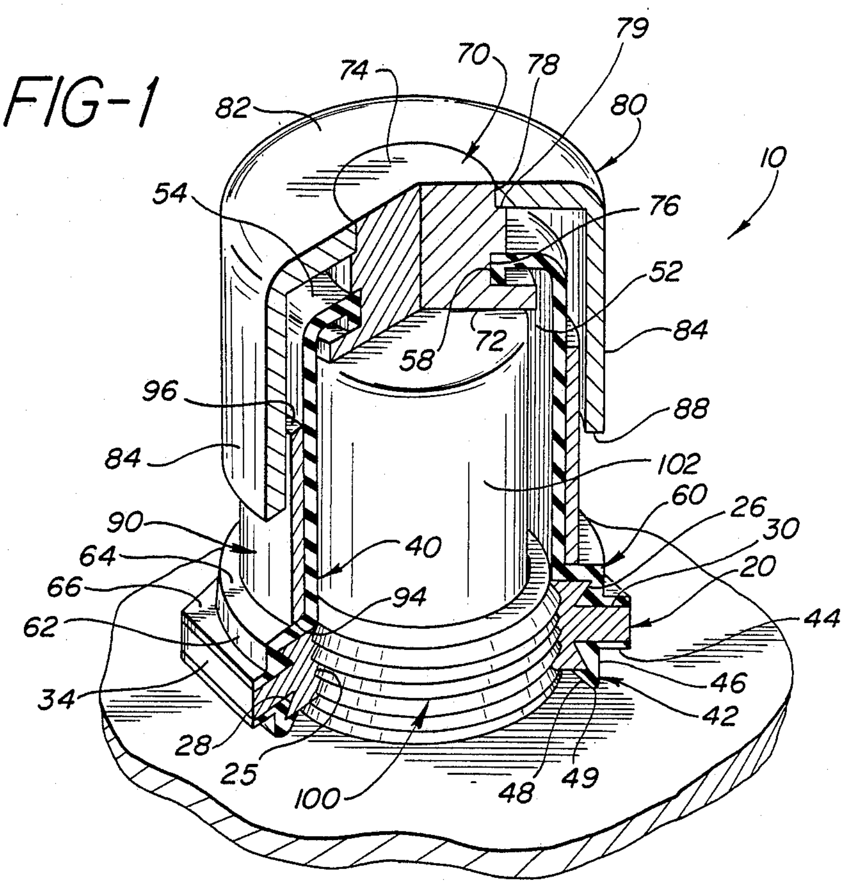
FIG. 1 is a front upper perspective of the axially displaceable sealing apparatus of the present invention partially broken away.
Figure 2:
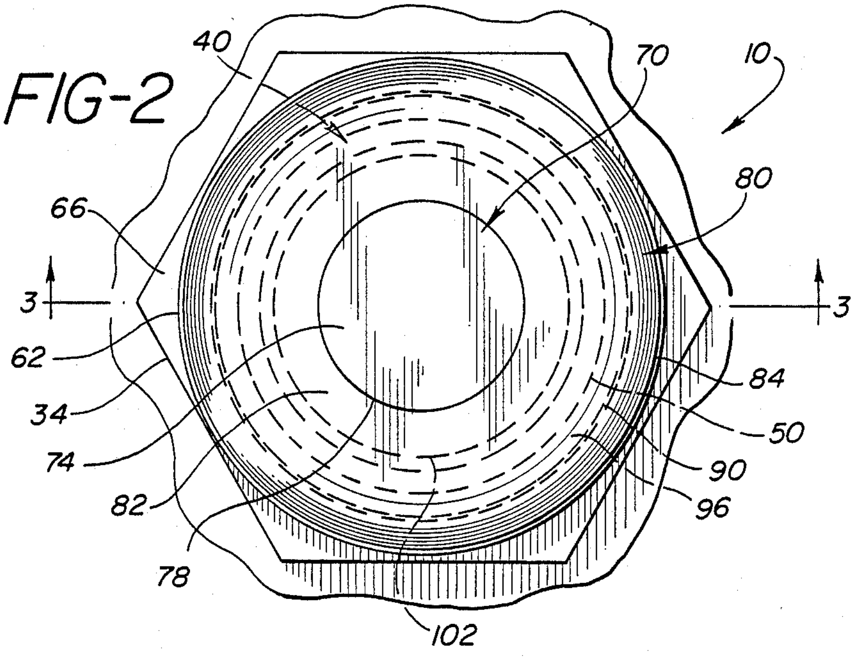
FIG. 2 is a plan view of the sealing apparatus shown in FIG. 1.
Figure 3:
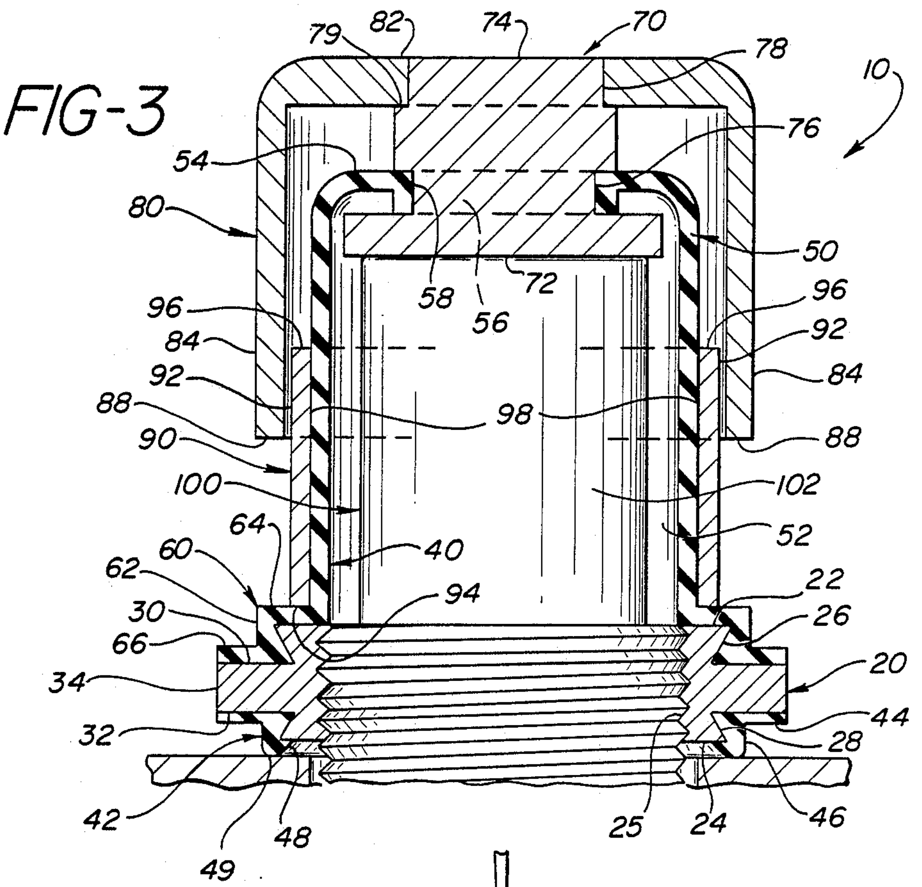
FIG. 3 is a sectional view taken along line 3—3 of FIG. 2.

Referring to FIGS. 1 through 4, an axially displaceable armored sealing apparatus of the present invention is generally shown at 10. The apparatus consists of an encapsulated nut element 20 which is connected to an anvil 70 by a portion of an elastomeric boot generally indicated at 40. The anvil 70 contacts the plunger 102 of a switch generally indicated at 100 and encloses the upper portion of the elastomeric boot 40. A movable cap 80 is connected to the anvil and is circumferentially disposed about and is axially displaceable in relation to a stationary cylinder 90.

More specifically, the nut element generally indicated at 20 has a top surface 22 and a bottom surface 24 with a threaded bore 25 running from the bottom to the top. Upper and lower tapered surfaces 26 and 28 respectively connect the top and bottom surfaces 22 and 24 to upper and lower intermediate horizontal surfaces 30 and 32 respectively which form a polygonal circumference 34, such as a standard hexagonal configuration, to coact with a wrench.

The resilient sealing element in the apparatus is a boot generally indicated at 40 which is an elastomer that could be any of the wide variety of materials, for example, synthetic resins such as silicone rubber. The boot consists of a lower nut sealing portion 42 for the under portion of the nut and an upper nut sealing portion 60 for the upper portion of the nut 20. The upper nut sealing portion 60 is connected to an upper portion generally indicated 50, which is a thin-walled elastomeric cylinder which forms a cavity 52 for the plunger of the switch. The lower nut sealing element 42 consists of a horizontal surface 44 and a vertical surface 46 extending downward which coacts with a tapered surface 48 to provide a lower sealing edge 49. The upper nut sealing segment 60 consists of a vertical cylindrical section 62 and inner and outer horizontal sections 64 and 66 respectively which are molded to the top 22 and upper intermediate horizontal surface 30 of the nut 20.

The upper portion of the boot consists of a thin-walled elastomer cylinder 50 having a closed over top portion 54 with an opening 56 in the top. The edge or end 58 of the opening 56 of the thin-walled cylinder 50 fits into a groove 76 in the anvil 70.

The anvil 70 has a large bottom surface 72 or actuating surface and an upper touching surface 74 which is intended as the contact point for the object, such as a finger, used to press the switch plunger. A lower groove 76 in the anvil is sized to hold the enlarged end 58 of the thin-walled elastomeric cylinder in sealing relationship. This can either be by means of a snap fit, or the end 58 can be cemented in place. The upper end of anvil 70 has a section of reduced diameter 78 which forms a shoulder 79 that is used to fasten the anvil to the top 82 of the movable cap 80.

The top 82 of movable cap 80 has an opening 86 which is of a diameter smaller than the shoulder 79 of the anvil so that there is an interfering portion where the two parts can be joined together either by opening, welding, bonding, or merely a force-fit if the diameter of the opening 86 in the top 82 of movable cap 80 is slightly smaller than the diameter of the upper groove 78 in the anvil.

Movable cap 80 has cylindrical sides 84 that extend down to an end 88. The inner circumference of the cylindrical sides of cap 80 is greater than the outer circumference 92 of a stationary cylinder 90 whose lower end 94 rests on the upper and inner horizontal surface 64 of the upper sealing segment for the nut. The upper end 96 of the stationary cylinder 90 extends high enough so that the lower end 88 of the movable cap 80 overlaps and there is absolutely no access to the thin-walled elastomeric cylinder 50.

The stationary cylinder 90 is shown here as being of metal such as steel while the movable cap 80 and the anvil are made from metal such as aluminum. Needless to say a wide variety of other materials could be used for each of these parts. However, it is found that the use of steel for stationary cylinder 90 and aluminum for movable cap 80 is a desirable combination since it tends to minimize any binding between the movable cap 80 and the stationary cylinder 90 during relative motion of one with the other.

It should be noted that the relatively large dimension of the inner diameter of the sides 84 of the movable cap 80 compared to the diameter of the inner surface 98 of the stationary cylinder allows room for deformation of the thin-walled elastomeric cylinder 50 as the anvil moves down when the sealing apparatus is actually displaced to actuate the plunger 102 of the push button switch.

As can be seen from FIG. 4, displacement of the movable cap 80 and anvil 70 will cause the thin-walled elastomeric cylinder 50 to double over on itself as the top 54 of the thin-walled elastomeric cylinder 50 is depressed below the fully extended level. This will tend to cause a bulging out on the sides of the thin-walled elastomeric cylinder 50 which bulge is accommodated by the space between the inner diameter of the stationary cylinder 90 and the inner diameter of the movable cap 80. This space therefore prevents binding of the thin-walled elastomeric cylinder 50 with the inner wall of the movable cap.

If there was no space for bulging of the elastomeric cylinder then binding would be a problem since the cap 80 moves relative to the adjacent surface of the thin-walled elastomeric cylinder 50.

Figure 4:
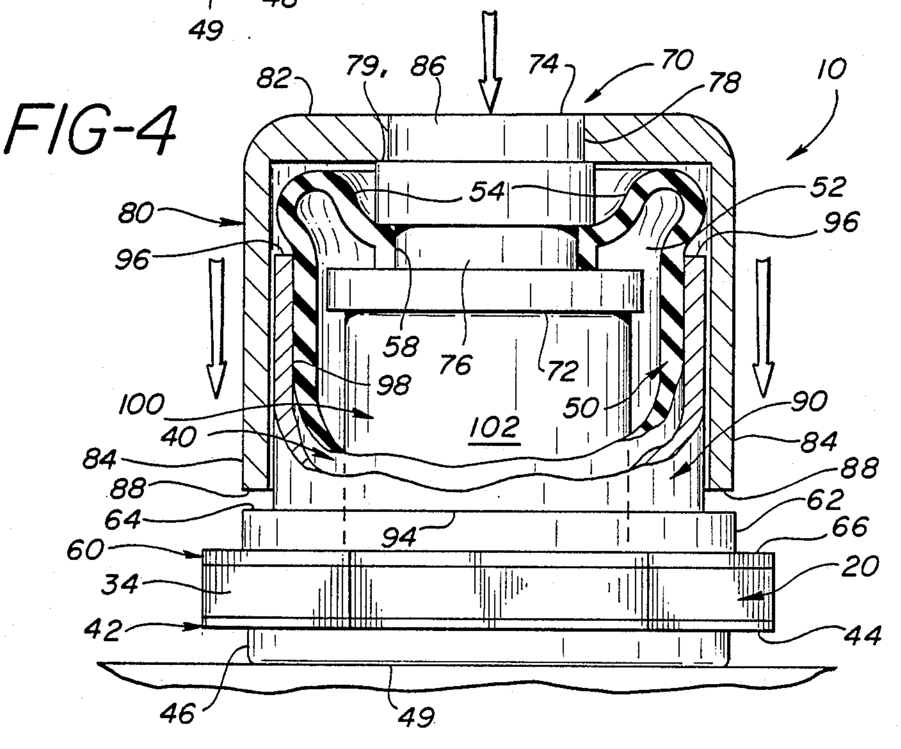
FIG. 4 is a view of the embodiment shown in FIG. 3 in the displaced or actuated position.

Also, as can be seen from FIG. 4 of the drawing, the displacement of the movable cap and the anvil, 80 and 70 respectively, is less than the distance between the bottom or end 88 of the movable cap 82 and the top surface which is the inner horizontal surface 64 of the upper nut sealing segment. Therefore, no stress will be generated on the sealing coating over the top of the nut surface by the movement of the movable cap. Similarly, the travel of anvil 70 is short enough so that the bottom surface of the top 82 of removable cap 80 will not contact the uppermost edge of the flexible thin-walled elastomeric cylinder as the anvil moves down. If the travel of the anvil were sufficiently great this would happen since the doubled-over edge of the thin-walled elastomeric cylinder is displaced only half of the travel of the lower surface of the anvil.

From the foregoing it is apparent that the present invention completely encloses the thin-walled elastomeric material necessary for sealing the push but-on switch to the panel on which such a switch would be mounted. The sealing apparatus of the present invention provides a hard stable surface for actuation by a person's finger or any other usual means to press or depress the plunger of the switch. The relatively fragile elastomeric portions of the switch therefore are completely protected and will have an extended service life in relation to the more common type of sealing apparatus which does not, in any way, protect or cover the relatively fragile elastomeric sealing materials.

It should also be noted that the entire assembly fits within the area of the hex of the nut. Therefore, the entire apparatus an be installed within the same installation envelope as is presently used by switches with or without special sealing means. Further, no special tools of any type would be necessary for the installation of the device in view of its installation envelope.

It will be understood that various changes in details, materials and arrangements of parts in operating conditions which have been herein described and illustrated in order to explain the nature of the invention may be made by those skilled in the art within the principles and scope of the invention.

I claim:

1. An axially displaceable armored seal to seal push button type switches to an opening in a panel surface comprising:

a nut;

a lower nut sealing means on the underside of the nut;

an upper nut sealing means on the upper side of the nut;

a flexible upper sealing member connected to the upper nut sealing means adapted to receive a plunger of a push button type switch;

an armored cap;

means connecting the armored cap to the upper flexible sealing member to form a cavity about a plunger of a push button switch;

said armored cap displaceable to contact a plunger in the cavity formed with the flexible sealing means and displace the plunger along its displaceable axis; and armored cap displacement guide means extending from said upper nut sealing means to guide said armored cap.

2. The axially displaceable armored seal according to claim 1 wherein said means connecting the armored cap to the upper sealing member comprise:

an anvil member connected to the armored cap;

an opening in the top of the flexible upper sealing member; and means connecting the anvil member to the opening in the top of the flexible upper sealing member.

3. The axially displaceable armored seal according to claim 2 wherein said anvil member includes a lower surface adapted to contact the plunger of a switch.

4. The axially displaceable armored seal according to claim 3 wherein:

the armored cap has a passage in the top thereof;

the anvil extends into the passage in the top of the armored cap; and the top of the anvil extending into the passage in the armored cap provides a touching surface for displacing the cap.

5. The axially displaceable armored seal according to claim 2, 3 or 4 wherein the means connecting the anvil member to the opening in the top of the flexible upper sealing member comprise:

groove means in the anvil member; and the opening in the top of the flexible upper sealing member coacting with the groove means to connect and seal the flexible upper sealing member to the anvil member.

6. The axially displaceable armored seal according to claim 5 wherein:

the armored cap includes a downwardly extending cylindrical portion; and the displacement guide means for the armored cap comprises cylinder means concentrically disposed with relation to the armored cap and the flexible upper sealing member.

7. The axially displaceable armored seal according to claim 6 wherein the displacement guide cylinder means is concentrically disposed between the upper flexible sealing member and the cylindrical portion of the armored cap.

8. The axially displaceable armored seal according to claim 7 wherein the space between the external surface of the upper flexible sealing member and the internal cylindrical surface of the armored cap unoccupied by the displacement guide cylinder allows for deformation of the flexible upper sealing member during displacement of the armored cap.

9. An axially displaceable armored seal to seal push button type switches to an opening in a panel surface comprising:

a nut;

a lower nut sealing means on the underside of the nut;

an upper nut sealing means on the upper side of the nut;

a flexible upper sealing member connected to the upper nut sealing means adapted to receive a plunger of a push button type switch;

an armored cap;

means connecting the armored cap to the upper sealing member to form a cavity about a plunger of a push button switch, said connecting means comprising:

an anvil member;

an opening in the top of the flexible upper sealing member;

the anvil member having a groove thereon adapted to coact with the opening in the top of the flexible upper sealing member to connect the flexible upper sealing member to the anvil member and seal the cavity;

the armored cap having a passage in the top thereof; and the top of the anvil extending into the passage in the top of the armored cap to provide a touching surface for displacing the armored cap; and armored cap displacement guide means comprising a cylindrical member extending from the upper nut sealing means and concentrically disposed within the armored cap to guide displacement of the armored cap.

* * * * *